United States Patent
Chang et al.

(10) Patent No.: US 8,767,808 B2
(45) Date of Patent: Jul. 1, 2014

(54) COMMUNICATION DEVICE AND METHOD FOR PROCESSING UNSOLICITED RESULT CODE

(75) Inventors: Chiao-Chih Chang, New Taipei (TW); Nan-Chun Chu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 403 days.

(21) Appl. No.: 13/207,442

(22) Filed: Aug. 11, 2011

(65) Prior Publication Data
US 2012/0257658 A1 Oct. 11, 2012

(30) Foreign Application Priority Data

Apr. 11, 2011 (TW) .............................. 100112363 A

(51) Int. Cl.
*H04B 1/38* (2006.01)

(52) U.S. Cl.
USPC ......... 375/222; 375/340; 455/414.1; 455/466

(58) Field of Classification Search
CPC ........... H04W 4/14; H04W 4/16; H04W 4/20; H04W 72/0406; H04W 88/184
USPC .......... 375/222, 242, 340, 341, 342; 370/252; 455/419, 466, 414.1
See application file for complete search history.

(56) References Cited

U.S. PATENT DOCUMENTS

| | | | | |
|---|---|---|---|---|
| 4,716,567 A | * | 12/1987 | Ito et al. | 714/753 |
| 6,519,644 B1 | * | 2/2003 | Lindquist et al. | 709/227 |
| 6,978,157 B1 | * | 12/2005 | Amiens | 455/558 |
| 2003/0045235 A1 | * | 3/2003 | Mooney et al. | 455/41 |
| 2007/0105548 A1 | * | 5/2007 | Mohan et al. | 455/426.1 |
| 2008/0056466 A1 | * | 3/2008 | Nishimura | 379/88.22 |

* cited by examiner

*Primary Examiner* — Sophia Vlahos
(74) *Attorney, Agent, or Firm* — Novak Druce Connolly Bove + Quigg LLP

(57) ABSTRACT

In a method for processing unsolicited result codes (URCs) of a communication device, keywords of a URC are extracted when the URC is sent from a modem of the communication device to an operating system of the communication device. A digital code of the keywords is obtained by encoding the extracted keywords. A function of the communication device is executed to process the received URC according to the digital code of the keywords.

15 Claims, 3 Drawing Sheets

COMMUNICATION DEVICE AND METHOD FOR PROCESSING UNSOLICITED RESULT CODE

BACKGROUND

1. Technical Field

Embodiments of the present disclosure relate generally to communication data processing technologies, and particularly, to a communication device and method for processing unsolicited result codes (URCs) of the communication device.

2. Description of Related Art

Unsolicited result codes (URCs) are messages that are sent from a modem of a communication device, such as a GSM/GPRS/CDMA modem, to notify the communication device to handle an event that is not directly associated with issuance of a command from the communication device. For example, "RING" is sent from the modem when the modem receives an incoming call, and "+CNMI" is sent when the modem receives a new short message (SMS). In a URCs processing method, when a URC is sent from the modem, keywords of the URC are extracted and are compared with a plurality of URC headers stored in the communication device, and then a function is called to handle the URC according to the comparison. However, in that comparison method, the keywords may be compared with each of the URC headers, which is time consuming and has a low efficiency.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
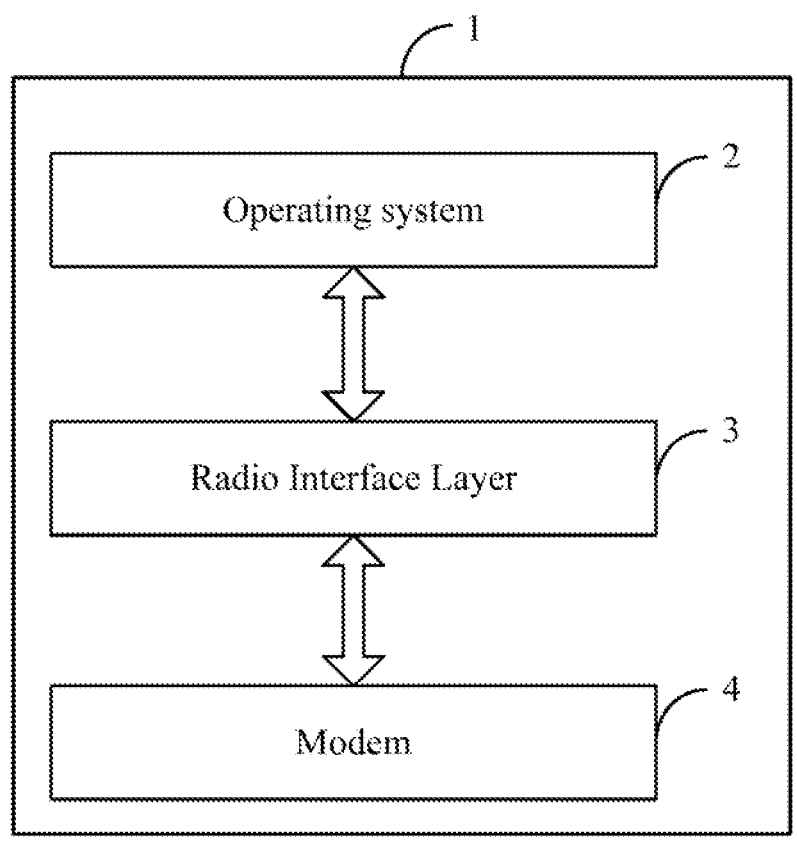
FIG. 1 is schematic diagram illustrating one example of a communication mechanism of a communication device.

FIG. 1 is schematic diagram illustrating one example of a communication mechanism of a communication device 1. The communication device 1 may include an operating system 2, a radio interface layer (RIL) 3, and a modem 4. The operating system 2 communicates with the modem 4 through the (RIL) 3. In the embodiment, the modem 4 may be a global system of mobile communication (GSM) modem, a code division multiple access (CDMA) modem, or a general packet radio service (GPRS) modem. The modem 4 may include at least one baseband processor (e.g., a GSM baseband processor or a CDMA baseband processor), radio frequency (RF) components, and other peripheral components. The RIL 3 provides a message communication interface between the operating system 2 and the modem 4, so that the modem 4 may communicate with the operating system 2. In one embodiment, the modem 4 may interact with the operating system 2 by sending attention (AT) commands When an event that is not directly associated with issuance of a command from the device 1 occurs, such as an incoming call event, the modem 4 may send an unsolicited result code (URC) corresponding the event to the operating system 2, so the event may be handled by the device 1.

Figure 2:
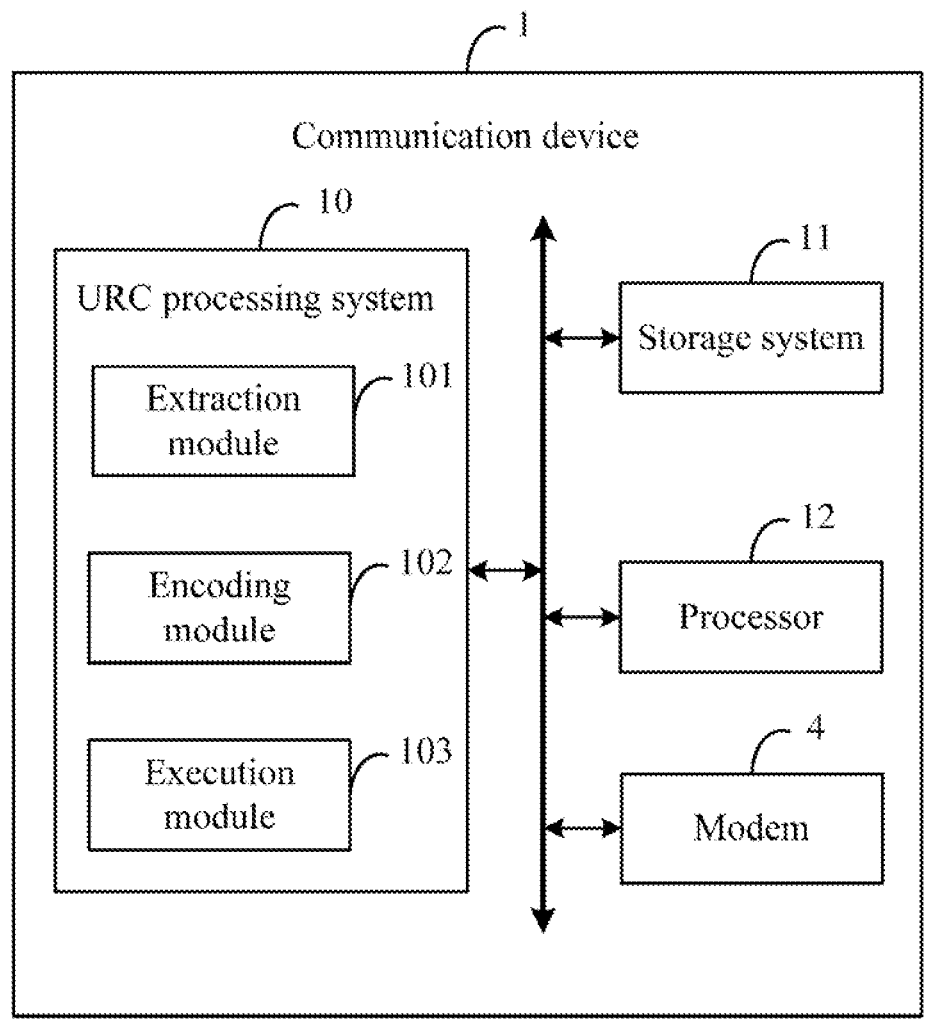
FIG. 2 is a block diagram of one embodiment of the communication device including an unsolicited result codes (URC) processing system.

FIG. 2 is a block diagram of one embodiment of the communication device 1 including an unsolicited result code (URC) processing system 10. In the embodiment, the device 1 further includes a storage system 11, a processor 12, and the modem 4. The URC processing system 10 can analyze URCs that are sent from the modem 4, and execute a corresponding function of the device 1 to handle the URCs. It should be apparent that FIG. 1 is only one example of the device 1 and the device 1 can include more or fewer components than those shown in the embodiment, or a different configuration of the various components.

The URC processing system 10 may include a plurality of software programs in a form of one or more computerized instructions stored in the storage system 11, and executed by the processor 12 to perform operations of the device 1. In the embodiment, the URC processing system 10 includes an extraction module 101, an encoding module 102, and an execution module 103. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The extraction module 101 is operable to extract keywords of a URC when the URC is sent from the modem 4 to the operating system 2. The URC may be a string composed of a plurality of characters, such as letters, numbers, and other particular characters. All the URCs sent from the modem 4 can be divided into two types, one type includes a colon, and another type does not include a colon. In the embodiment, the URCs that do not include the colon are "NO CARRIER", "BUSY", and "RING". In other embodiments, other kinds of strings that do not include the colon may be defined as the URCs according to requirements. If the received URC does not include a colon, all characters of the URC are extracted as keywords. If the received URC includes a colon, only the characters before the colon of the URC are extracted as keywords. For example, if the received URC is "+CCWA:<status>, <class1> . . . ", "+CCWA" may be extracted as keywords. The extracted keywords may be used to determine a corresponding function of the device 1 to handle the URC.

The encoding module 102 is operable to encode the extracted keywords, to obtain a digital code of the keywords. In one embodiment, if the keywords are "NO CARRIER", "BUSY", or "RING", the keywords may correspondingly be encoded into a digital code "1", "2", or "3". If the keywords are not "CARRIER", "BUSY", or "RING", the encoding module 102 may encode the keywords according to the following steps. First, the encoding module 102 encodes a combination character "+C" or "*PS" of the keywords into a digital code "29" or "30", to a digital code of the combination character. Second, the encoding module 102 correspondingly encodes capital letters "A, B, C, . . . , and Z" of the keywords into digital codes "0, 1, 2, . . . , and 25", to a obtain a digital code of each of the capital letters. Third, the encoding module 102 encodes special characters "^", "+", "*", and a space character of the keywords to a digital code "26", "27", "28", and "31" correspondingly, to obtain a digital code of each of the special characters. Finally, the encoding module 102 combines the digital codes of the combination character, the capital letters, and the special characters to form the digital code of the keywords. In other embodiments, the keywords may be encoded according to other encoding methods.

In one example, if an extracted keywords is "+CCWA", the combination character "+C" is encoded into "29", which is expressed as a binary number "11101". The capital letters "C", "W", and "A" are respectively encoded into "2", "22", and "0", which are respectively expressed as binary numbers "00010", "10110", and "00000". Then, the binary numbers "11101", "00010", "10110", and "00000" are combined to form a digital code representing "+CCWA", which in binary is "00000101100001011101", and in hexadecimal is "0x0000585D".

The execution module 103 is operable to execute a function of the device 1 to process the received URC according to the digital code of the keywords. In the embodiment, each of the URCs of the device 1 may correspond to a function. When the keywords of the URC are encoded, the corresponding function is determined according the digital code of the keywords. In one example, the execution module 103 may execute the function using the following pseudo codes:

```
switch (result.value[0]) //result.value[0] is a digital code of keywords
{
case 0x00000001: //NO CARREIR
call function(A); break;
case 0x0000585D: //+CCWA:
call function(B); break;
case 0x00000002: //BUSY
call function(C); break;
case 0x000781BD: //+CNAP:
call function(D);
...;
}
```

Figure 3:
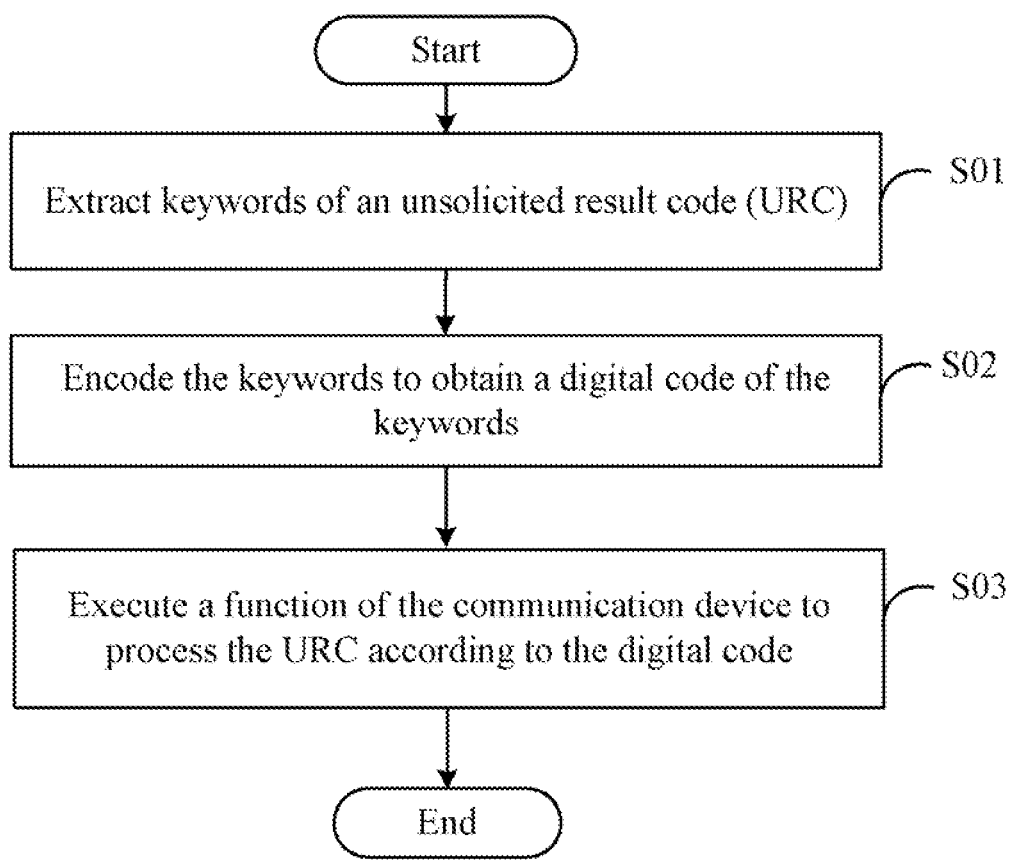
FIG. 3 is a flowchart of one embodiment of a method for processing unsolicited result codes of the communication device using the system of FIG. 2.

FIG. 3 is a flowchart of one embodiment of a method for processing URCs of the device 1 using the system 10 of FIG. 2. Depending on the embodiment, additional blocks may be added, others removed, and the ordering of the blocks may be changed.

In block S01, the extraction module 101 extracts keywords of a URC when the URC is sent from the modem 4 to the operating system 2 of the communication device 1. The URC may be a string that is composed of a plurality of characters, such as letters, numbers, and other particular characters. The URC may include a colon, or not include a colon. If the received URC does not include a colon, all characters of the URC are extracted as the keywords. If the received URC includes a colon, characters before the colon of the URC are extracted as the keywords.

In block S02, the encoding module 102 encodes the extracted keywords to obtain a digital code of the keywords. Details of encoding the keywords are described above.

In block S03, the execution module 103 executes a function of the device 1 to process the received URC according to the digital code of the keywords. In the embodiment, each of the URCs sent from the modem 4 may correspond to a function. When the keywords of the URC are encoded, the corresponding function is determined and executed according to the digital code of the keywords.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for processing unsolicited result codes (URCs) of a communication device, the method comprising:
   extracting keywords of an unsolicited result code (URC) when the URC is sent from a modem of the communication device to an operating system of the communication device, characters before a colon of the URC being extracted as the keywords when the received URC comprises the colon;
   encoding the extracted keywords to obtain a digital code of the keywords; and
   executing a function of the communication device to process the received URC according to the digital code of the keywords.

2. The method according to claim 1, wherein the extracting step comprises:
   extracting all characters of the URC as the keywords, when the received URC does not comprise a colon.

3. The method according to claim 1, wherein the encoding step comprises:
   encoding the keywords into a digital code "1", "2", or "3" in response to the keywords being "NO CARRIER", "BUSY", or "RING"; and
   encoding a combination character "+C" or "*PS" of the keywords into a digital code "29" or "30" correspondingly to obtain a digital code of the combination character, encoding capital letters "A, B, C, . . . , and Z" of the keywords into digital codes "0, 1, 2, . . . , 25" correspondingly to obtain digital codes of the capital letters, encoding special characters "0", "+", "*", and a space character of the keywords into a digital code "26", "27", "28", and "31" correspondingly to obtain digital codes of the special characters, and combining the digital codes of the combination character, the capital letters, and the special characters to form the digital code of the keywords, if the keywords are not "CARRIER", "BUSY", or "RING".

4. The method according to claim 1, wherein the modem is a GSM modem, a CDMA modem, or a GPRS modem.

5. The method according to claim 1, wherein the URC is sent by the modem, when an event that is not directly associated with issuance of a command from the communication device occurs.

6. A communication device, comprising:
   at least one processor;
   a storage system; and
   one or more programs stored in the storage system and being executable by the at least one processor, when executed by the at least one processor, the one or more programs cause:
   an extraction module to extract keywords of an unsolicited result code (URC) when the URC is sent from a modem of the communication device to an operating system of the communication device;
   the extraction module further to extract characters before a colon of the URC as the keywords when the received URC comprises the colon;
   an encoding module to encode the extracted keywords to obtain a digital code of the keywords; and
   an execution module to execute a function of the communication device to process the received URC according to the digital code of the keywords.

7. The communication device according to claim 6, wherein the one or more programs further cause the extraction module further to extract all characters of the URC as the keywords, when the received URC does not comprise a colon.

8. The communication device according to claim 6, wherein the keywords are encoded by:
- encoding the keywords into a digital code "1", "2", or "3" in response to the keywords being "NO CARRIER", "BUSY", or "RING"; and
- encoding a combination character "+C" or "*PS" of the keywords into a digital code "29" or "30" correspondingly to obtain a digital code of the combination character, encoding capital letters "A, B, C, . . . , and Z" of the keywords into digital codes "0, 1, 2, . . . , 25" correspondingly to obtain digital codes of the capital letters, encoding special characters "ô", "+", "*", and a space character of the keywords into a digital code "26", "27", "28", and "31" correspondingly to obtain digital codes of the special characters, and combining the digital codes of the combination character, the capital letters, and the special characters to form the digital code of the keywords, if the keywords are not "CARRIER", "BUSY", or "RING".

9. The communication device according to claim 6, wherein the modem is a GSM modem, a CDMA modem, or a GPRS modem.

10. The communication device according to claim 6, wherein the URC is sent by the modem, when an event that is not directly associated with issuance of a command from the communication device occurs.

11. A non-transitory storage medium storing a set of instructions, the set of instructions when executed by a processor of a communication device, cause the communication device to perform a method for processing unsolicited result codes (URCs), the method comprising:
- extracting keywords of an unsolicited result code (URC) when the URC is sent from a modem of the communication device to an operating system of the communication device, wherein characters before a colon of the URC are extracted as the keywords when the received URC comprises the colon;
- encoding the extracted keywords to obtain a digital code of the keywords; and
- executing a function of the communication device to process the received URC according to the digital code of the keywords.

12. The non-transitory storage medium according to claim 11, wherein the extracting step comprises:
- extracting all characters of the URC as the keywords, if the received URC does not comprise a colon.

13. The non-transitory storage medium according to claim 11, wherein the encoding steps comprises:
- encoding the keywords into a digital code "1", "2", or "3" in response to the keywords being "NO CARRIER", "BUSY", or "RING"; and
- encoding a combination character "+C" or "*PS" of the keywords into a digital code "29" or "30" correspondingly to obtain a digital code of the combination character, encoding capital letters "A, B, C, . . . , and Z" of the keywords into digital codes "0, 1, 2, . . . , 25" correspondingly to obtain digital codes of the capital letters, encoding special characters "ô", "+", "*", and a space character of the keywords into a digital code "26", "27", "28", and "31" correspondingly to obtain digital codes of the special characters, and combining the digital codes of the combination character, the capital letters, and the special characters to form the digital code of the keywords, if the keywords are not "CARRIER", "BUSY", or "RING".

14. The non-transitory storage medium according to claim 11, wherein the modem is a GSM modem, a CDMA modem, or a GPRS modem.

15. The non-transitory storage medium according to claim 11, wherein the URC is sent by the modem, when an event that is not directly associated with issuance of a command from the communication device occurs.

* * * * *